United States Patent
Kuwahara et al.

(10) Patent No.: US 8,978,416 B2
(45) Date of Patent: Mar. 17, 2015

(54) PROCESS FOR PRODUCING GLASS SUBSTRATE PROVIDED WITH INORGANIC FINE PARTICLE-CONTAINING SILICON OXIDE FILM

(71) Applicant: Asahi Glass Company, Limited, Chiyoda-ku (JP)

(72) Inventors: Yuichi Kuwahara, Chiyoda-ku (JP); Keisuke Abe, Chiyoda-ku (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 152 days.

(21) Appl. No.: 13/710,754

(22) Filed: Dec. 11, 2012

(65) Prior Publication Data
US 2013/0098112 A1  Apr. 25, 2013

Related U.S. Application Data

(63) Continuation of application No. PCT/JP2011/063180, filed on Jun. 8, 2011.

(30) Foreign Application Priority Data

Jun. 11, 2010 (JP) .................. 2010-134187

(51) Int. Cl.
*C03C 17/25* (2006.01)
*C03C 17/00* (2006.01)

(52) U.S. Cl.
CPC ............. *C03C 17/25* (2013.01); *C03C 17/002* (2013.01); *C03C 17/007* (2013.01); *C03C 2217/452* (2013.01); *C03C 2217/465* (2013.01); *C03C 2217/475* (2013.01); *C03C 2217/476* (2013.01);

(Continued)

(58) Field of Classification Search
None
See application file for complete search history.

(56) References Cited

U.S. PATENT DOCUMENTS 4,522,847 A * 6/1985 Cornet et al. ................. 427/557
2013/0048032 A1 * 2/2013 Johnson .......................... 134/37

FOREIGN PATENT DOCUMENTS

EP  1 816 109 A1  8/2007
GB  937448 A  *  9/1963
JP  6-48776  2/1994

(Continued)

OTHER PUBLICATIONS

Shin-Etsu, "Shin-Etsu Silicone Reactive & Non-Reactive Modified Silicone Fluid", Brochure 2006.*

(Continued)

*Primary Examiner* — Lisa Herring
(74) *Attorney, Agent, or Firm* — Oblon, Spivak, McClelland, Maier & Neustadt, L.L.P.

(57) ABSTRACT

A process for producing a glass substrate provided with an inorganic fine particle-containing silicon oxide film, which comprises applying a coating liquid containing an organopolysiloxane having an exothermic peak temperature of at most 500° C. and inorganic fine particles to a glass substrate within a temperature range of from 400 to 650° C., or a process for producing a glass substrate, comprising forming molten glass into a glass ribbon, annealing the glass ribbon and cutting it to produce a glass substrate, wherein a coating liquid containing an organopolysiloxane having an exothermic peak temperature of at most 500° C. and inorganic fine particles is applied to the glass ribbon at a position where the glass ribbon is within a temperature range of from 400 to 650° C.

15 Claims, 2 Drawing Sheets

(52) U.S. Cl.
CPC ..... *C03C 2217/477* (2013.01); *C03C 2217/479* (2013.01)
USPC .......................................... 65/60.5; 427/110

(56) References Cited

FOREIGN PATENT DOCUMENTS

| | | |
|---|---|---|
| JP | 7-97237 | 4/1995 |
| JP | 10-316885 | 12/1998 |
| JP | 2008-201624 | 9/2008 |
| WO | WO 2007/020783 | 2/2007 |
| WO | 2008/139920 | 11/2008 |

OTHER PUBLICATIONS

Arbab et al., "Value-Added Flat-Glass Products for the Building, Transporation, Markets, Part 1", American Chemical Society Bulletin, vol. 84, No. 1, Jan. 2005—hereinafter Arbab.*
Pulker, "Coatings on Glass", Elsevier, pp. 136-138, 1999.*
International Search Report issued Jul. 12, 2011 in PCT/JP2011/063180 filed Jun. 8, 2011.
U.S. Appl. No. 13/710,780, filed Dec. 11, 2012, Kuwahara, et al.
European Search Report issued Nov. 6, 2014, in corresponding European Patent Application No. 11792502.4.

* cited by examiner

PROCESS FOR PRODUCING GLASS SUBSTRATE PROVIDED WITH INORGANIC FINE PARTICLE-CONTAINING SILICON OXIDE FILM

TECHNICAL FIELD

The present invention relates to a process for producing a glass substrate provided with an inorganic fine particle-containing silicon oxide film.

BACKGROUND ART

A glass substrate is required to have not only antireflection function (a low reflectance and a high transmittance) but also other functions (e.g. ultraviolet shielding, infrared shielding, antistatic, photocatalyst, wavelength conversion) in some cases depending upon the application. For example, for a cover glass for a solar cell, an antireflection function is required to improve the power generation efficiency and in addition, an ultraviolet shielding function is required to suppress deterioration in the interior by ultraviolet light.

To prepare a film having a heat ray reflection function on a glass substrate at high temperature, a method of spraying a coating liquid containing an organic titanium compound and an organic silicon compound over a glass substrate at high temperature to form a silicon oxide-containing titanium oxide film on the glass substrate by thermal decomposition has been known (Patent Document 1).

PRIOR ART DOCUMENT

Patent Document

Patent Document 1: JP-B-56-18547

DISCLOSURE OF INVENTION

Technical Problem

However, in Patent Document 1, a thermally decomposable organic titanium compound is used to impart a heat ray reflection function to the film. In film formation using an organic titanium compound, a film is formed by a thermal decomposition reaction of the organic titanium compound on a glass substrate at high temperature. Therefore, in order to form the film with a good deposition efficiency on the glass substrate, the thermal decomposition temperature (exothermic peak) should be adjusted. Likewise, in the case of the organic silicon compound, the thermal decomposition temperature should be adjusted. Thus, if two compounds are used, the respective thermal decomposition temperatures must be considered, and therefore, the combination of compounds to be used is limited.

The present invention provides a process for producing a glass substrate provided with an inorganic fine particle-containing silicon oxide film having a high light transmittance with good production efficiency, with which an inorganic fine particle-containing silicon oxide film having functions derived from the inorganic fine particles imparted can be directly formed on a glass substrate at high temperature.

The present invention further provides a process for producing a glass substrate via a glass ribbon (a sheet-form continuous formed product of glass), which comprises directly forming an inorganic fine particle-containing silicon oxide film having functions derived from the inorganic fine particles imparted on the glass ribbon at high temperature, with which a glass substrate provided with an inorganic fine particle-containing silicon oxide film having a high light transmittance can be produced with good production efficiency.

Solution to Problem

The process for producing a glass substrate provided with an inorganic fine particle-containing silicon oxide film of the present invention relates to the following embodiments (1) and (2).

(1) A process for producing a glass substrate provided with an inorganic fine particle-containing silicon oxide film, which comprises applying a coating liquid containing an organopolysiloxane having a main exothermic peak temperature when heated at a heating rate of 10° C./min of at most 500° C. and inorganic fine particles to a glass substrate within a temperature range of from 400 to 650° C. to form an inorganic fine particle-containing silicon oxide film on the glass substrate.

In the embodiment (1), it is preferred to use, as the organopolysiloxane, an organopolysiloxane having a main exothermic peak temperature when heated at a heating rate of 10° C./min within a range of at least 300° C. and less than the temperature of the glass substrate when the coating liquid is applied.

Further, it is preferred that the difference between the main exothermic peak temperature of the organopolysiloxane when heated at a heating rate of 10° C./min and the temperature of the glass substrate when the coating liquid is applied, is at least 30° C.

Further, it is preferred that the coating liquid further contains a liquid medium.

Further, it is preferred that the boiling point of the liquid medium is at least 60° C.

Further, it is preferred that the organopolysiloxane is a silicone oil.

Further, it is preferred that the silicone oil is a long chain alkyl-modified silicone oil.

Further, it is preferred that the viscosity average molecular weight of the silicone oil and the long chain alkyl-modified silicone oil is from 3,500 to 130,000.

Further it is preferred that the proportion of the organopolysiloxane is from 70 to 98 mass %, and the proportion of the inorganic fine particles is from 2 to 30 mass %, per 100 mass % of the total amount of the organopolysiloxane and the inorganic fine particles in the coating liquid containing the organopolysiloxane and the inorganic fine particles.

(2) A process for producing a glass substrate provided with an inorganic fine particle-containing silicon oxide film, which is a process for producing a glass substrate comprising forming molten glass into a glass ribbon, annealing the glass ribbon and cutting it to produce a glass substrate, wherein a coating liquid containing an organopolysiloxane having a main exothermic peak temperature when heated at a heating rate of 10° C./min of at most 500° C. and inorganic fine particles is applied to the glass ribbon at a position where the glass ribbon is within a temperature range of from 400 to 650° C. to form an inorganic fine particle-containing silicon oxide film on the glass ribbon.

In the embodiment (2), it is preferred that the molten glass is formed into a glass ribbon in a float bath, and the coating liquid is applied between the float bath and the annealing step or in the annealing step.

Further, it is preferred to use, as the organopolysiloxane, an organopolysiloxane having a main exothermic peak temperature when heated at a heating rate of 10° C./min within a range of at least 300° C. and less than the temperature of the glass ribbon when the coating liquid is applied.

Further, it is preferred that the difference between the main exothermic peak temperature of the organopolysiloxane when heated at a heating rate of 10° C./min and the temperature of the glass ribbon at a position where the coating liquid is applied, is at least 30° C.

Further, it is preferred that the coating liquid further contains a liquid medium.

Further, it is preferred that the boiling point of the liquid medium is at least 60° C.

Further, it is preferred that the organopolysiloxane is a silicone oil.

Further, it is preferred that the silicone oil is a long chain alkyl-modified silicone oil.

Further, it is preferred that the viscosity average molecular weight of the silicone oil and the long chain alkyl-modified silicone oil is from 3,500 to 130,000.

Further, it is preferred that the proportion of the organopolysiloxane is from 70 to 98 mass %, and the proportion of the inorganic fine particles is from 2 to 30 mass %, per 100 mass % of the total amount of the organopolysiloxane and the inorganic fine particles in the coating liquid containing the organopolysiloxane and the inorganic fine particles.

Advantageous Effects of Invention

According to the process for producing a glass substrate provided with an inorganic fine particle-containing silicon oxide film of the present invention, an inorganic fine particle-containing silicon oxide film having functions derived from the inorganic fine particles imparted can be directly formed on a glass substrate or a glass ribbon at high temperature, and a glass substrate provided with an inorganic fine particle-containing silicon oxide film having a high light transmittance can be produced with good production efficiency.

DESCRIPTION OF EMBODIMENTS

<Process for Producing Glass Substrate Provided with Inorganic Fine Particle-Containing Silicon Oxide Film>

The process for producing a glass substrate provided with an inorganic fine particle-containing silicon oxide film of the present invention is a process which comprises applying a coating liquid containing an organopolysiloxane and inorganic fine particles to a glass substrate or a glass ribbon to be a glass substrate, and thermally decomposing the organopolysiloxane to form an inorganic fine particle-containing silicon oxide film on the glass substrate or the glass ribbon.
(Glass Substrate)

The material of the glass substrate may, for example, be soda lime silica glass, borosilicate glass or aluminosilicate glass. Further, the glass substrate is preferably a raw glass substrate which is not reinforced, since it is applied to a process for producing a glass substrate comprising forming molten glass into a glass ribbon, annealing the glass ribbon and cutting it to produce a glass substrate, wherein a coating liquid containing an organopolysiloxane and inorganic fine particles is applied to the glass ribbon to form an inorganic fine particle-containing silicon oxide film on the glass ribbon.
(Organopolysiloxane)

The organopolysiloxane means a polymer having siloxane bonds (—Si—O—Si—) as a skeleton and having organic groups bonded to the silicon atoms. Each organic group is an organic group in which the atom bonded to the silicon atom is a carbon atom. To some of the silicon atoms, an atom or a group (for example, a hydrogen atom, a hydroxy group or a hydrolyzable group) other than the organic group may be bonded. A hydrolyzable group is a group capable of being converted to a hydroxy group by reaction with water, and may, for example, be a halogen atom (such as a chlorine atom), a group in which the atom bonded to the silicon atom is an oxygen atom (such as an alkoxy group or an acyl group) or a group in which the atom bonded to the silicon atom is a nitrogen atom (such as an amino group). Unlike the hydrolyzable group, the above organic group is nonhydrolyzable.

The organic group which is a nonhydrolyzable group is preferably a hydrocarbon group (an organic group comprising carbon atoms and hydrogen atoms). Further, the organic group may be an organic group having a hetero atom (such as an oxygen atom or a nitrogen atom), an organic group having a halogen atom (such as a fluorine atom) or the like. The hetero atom may be part of a reactive group (such as an epoxy group, a carboxy group or an amino group). The hydrocarbon group may, for example, be an alkyl group (such as a methyl group or an ethyl group), an alkenyl group (such as a vinyl group, an allyl group or an ethynyl group) or an aryl group (such as a phenyl group).

The organopolysiloxane may, for example, be a linear polymer in which the skeleton of the siloxane bonds has a linear structure, a branched polymer in which the skeleton has a branched structure, a crosslinked polymer in which the skeleton has a network structure, or a three-dimensional crosslinked polymer in which the skeleton has a three-dimensional network structure. Further, as another organopolysiloxane, a crosslinked polymer in which at least two skeletons of the siloxane bonds having a linear structure are connected with a bivalent or higher valent organic group (such as an alkylene group), a polymer in which the skeleton of the siloxane bonds and an organic polymer skeleton having no siloxane bond are bonded, may, for example, be mentioned. The above various organopolysiloxanes may be used in the present invention.

The organopolysiloxane in the present invention, described in detail below, is preferably one which is thermally decomposed and converted to silicon oxide on the glass substrate or the glass ribbon at a temperature within a range of from 400 to 650° C., and considering the exothermic peak temperature of the inorganic fine particles, one having an exothermic peak temperature of at most 500° C. Particularly, an organopolysiloxane which is liquid by itself, one which can be soluble in a liquid medium to be a solution, or one which can be dispersed in a liquid medium to be a dispersion is preferred.

The organopolysiloxane in the present invention is preferably a linear polymer in view of the deposition efficiency of the inorganic fine particle-containing silicon oxide film and availability, particularly preferably a linear diorganopolysiloxane among the above organopolysiloxanes. A diorganopolysiloxane is a polymer having silyloxy groups to which two organic groups are bonded as repeating units, and in a linear diorganopolysiloxane, three organic groups are bonded to the silicon atom at each terminal. Some of the organic groups may be a hydrogen atom. Each organic group is usually an alkyl group (particularly a methyl group) having at most 4 carbon atoms, and some of the organic groups may be an alkenyl group or a phenyl group. Further, each organic group may be an organic group having a hetero atom (such as an oxygen atom or a nitrogen atom), an organic group having a halogen atom (such as a fluorine atom) or the like, as mentioned above.

The organopolysiloxane in the present invention is particularly preferably a silicone oil in view of the deposition efficiency of the inorganic fine particle-containing silicon oxide film and the viscosity (handling efficiency) of the coating liquid. The silicone oil in the present invention means a linear organopolysiloxane which is an oily compound having fluidity at room temperature. The silicone oil is usually represented by the following formula (1):

(1)

wherein each of $R^1$ to $R^5$ is an organic group or a hydrogen atom, and n is an integer of at least 1, provided that when $R^1$ to $R^5$ are organic groups, they may be the same or different. The bifunctional unit in the bracket [ ] is usually called D unit, and each of monofunctional units outside the bracket [ ] at both terminals is called M unit. In a case where n is an integer of at least 2 (that is, in a case where there are two or more D units), such D units may be different from each other. The two M units may also be different from each other. D units being different from each other means that they are different in at least one of $R^1$ and $R^2$. M units being different from each other means that they are different in at least one of $R^3$, $R^4$ and $R^5$.

The silicone oil represented by the formula (1) is preferably a silicone oil wherein all $R^1$ to $R^5$ are a methyl group, or a silicone oil wherein some of $R^1$ to $R^5$ are a hydrogen atom or an organic group other than a methyl group, and the others are a methyl group. Hereinafter, in a case where all $R^1$ to $R^5$ are a methyl group, such D unit will be referred to as $D^1$ unit and such M unit will be referred to as $M^1$ unit. On the other hand, D unit wherein one of $R^1$ and $R^2$ is a methyl group and the other is a hydrogen atom or an organic group other than a methyl group will be referred to as $D^2$ unit, and M unit wherein two of $R^3$ to $R^5$ are a methyl group and the other one is a hydrogen atom or another organic group will be referred to as $M^2$ unit. According to this representation, a silicone oil represented by the formula (1) wherein all $R^1$ to $R^5$ are a methyl group can be represented by $M^1(D^1)_n M^1$. In a case where the silicone oil represented by the formula (1) has a hydrogen atom or an organic group other than a methyl group, bonded to a silicon atom, preferred is a silicone oil represented by $M^1(D^1)_p(D^2)_q M^1$, a silicone oil represented by $M^2(D^1)_n M^2$ or a silicone oil represented by $M^2(D^1)_p(D^2)_q M^2$ (wherein each of p and q is an integer of at least 1, and p+q=n). The organic group other than a methyl group is preferably an alkyl group (such as an ethyl group) having at least 2 carbon atoms, a polyfluoroalkyl group, a phenyl group, an organic group having a hetero atom (such as an oxygen atom or a nitrogen atom) (particularly an organic group having a reactive group (such as an epoxy group or an amino group)) or the like.

A silicone oil wherein all $R^1$ to $R^5$ are a methyl group is called dimethyl silicone oil. Further, a silicone oil wherein some of $R^1$ to $R^5$ are a phenyl group and the others are a methyl group is called methyl phenyl silicone oil, and a silicone oil wherein some of $R^1$ to $R^5$ are a hydrogen atom and the others are a methyl group is called methyl hydrogen silicone oil. Further, a silicone oil wherein some of $R^1$ to $R^5$ are a long chain alkyl group (preferably a $C_{6-22}$ linear alkyl group), an organic group having a hetero atom (such as an oxygen atom or a nitrogen atom) or an organic group having a halogen atom (such as a fluorine atom) and the others are a methyl group is called a modified silicone oil. In the present invention, the silicone oil is meant to include the modified silicone oil. The modified silicone oil is called, for example, epoxy-modified silicone oil, carboxy-modified silicone oil, long chain alkyl-modified silicone oil, amino-modified silicone oil or polyether-modified silicone oil, depending on the type of the organic group other than a methyl group or the type of a reactive group which this organic group has. The silicone oil in the present invention is preferably an epoxy-modified silicone oil or a long chain alkyl-modified silicone oil in view of the deposition efficiency of the inorganic fine particle-containing silicon oxide film, particularly preferably a long chain alkyl-modified silicone oil having an alkyl group having at least 5 carbon atoms. Such a long chain alkyl-modified silicone oil is more preferably a long chain alkyl-modified silicone oil having an alkyl group having at least 5 and at most 20 carbon atoms. If the alkyl chain length is longer than a carbon number of 20, the silicone oil will be solid at room temperature, such being unfavorable in view of handling efficiency.

n in the formula (1) represents the degree of polymerization, and among silicone oils wherein $R^1$ to $R^5$ are the same, usually the higher n is, the higher the viscosity is. Accordingly, the value of n (i.e. the molecular weight) can be measured by the viscosity of a silicone oil, and such a molecular weight is called viscosity average molecular weight. The silicone oil in the present invention is preferably a silicone oil having a viscosity average molecular weight of from 3,500 to 130,000, more preferably a silicone oil of from 3,500 to 100,000, further preferably a silicone oil of from 6,000 to 55,000.

When the silicone oil has a viscosity average molecular weight of at least 3,500, it will hardly be vaporized before the coating liquid is attached to the glass substrate or the glass ribbon, whereby the deposition efficiency of the inorganic fine particle-containing silicon oxide film will be good. When the silicone oil has a viscosity average molecular weight of at most 130,000, the haze can be suppressed low, and a transmittance can be maintained high. Further, the viscosity of the silicone oil will not be too high, whereby good handling efficiency will be obtained.

The viscosity average molecular weight of a silicone oil is obtained by the following procedure.

(I) The kinematic viscosity $\eta(25°$ C. and $40°$ C.) of the silicone oil is obtained.

(II) When the kinematic viscosity $\eta$ is at least 100 mm$^2$/sec, the molecular weight M is obtained from Barry's formula of the following formula (2). When the kinematic viscosity $\eta$ is less than 100 mm$^2$/sec, the molecular weight M is obtained from Warrik's formula of the following formula (3).

$$\log \eta^{cs/25° C.} = 1.00 + 0.0123 M^{0.5} \quad (2)$$

$$\log \eta^{p/40° C.} = 1.43 \log M - 5.54 \quad (3)$$

wherein
$\eta^{cs/25° C.}$: the kinematic viscosity at 25° C.,
$\eta^{p/40° C.}$: the viscosity at 40° C.,
M: viscosity average molecular weight.

Further, as the organopolysiloxane in the present invention, in addition to the silicone oil, an organopolysiloxane which can be thermally decomposed to be converted to silicon oxide on a glass substrate or a glass ribbon within a temperature range of from 400 to 650° C. may be used. Such an organopolysiloxane may, for example, be a silicone resin, a silicone rubber, a silicone elastomer or a compound having a siloxane bond as a skeleton which is a material therefor.

A silicone resin is a curable organopolysiloxane comprising, as the main constituting units, trifunctional units represented by $R^6SiO_{3/2}$ (wherein $R^6$ is the same organic group as for the above $R^1$ to $R^5$) in which one organic group is bonded to a silicone atom, called T units. The silicone resin may have the above D unit in addition to T units. Further, it may have a tetrafunctional unit (represented by $SiO_{4/2}$) called Q unit or the above M unit. The silicone resin before curing may be used as the organopolysiloxane in the present invention. A silicone rubber and a silicone elastomer are polymers obtainable by crosslinking a crosslinkable organopolysiloxane (an organopolysiloxane having a crosslinkable organic group (such as a vinyl group), an organopolysiloxane having a silicon atom to which a silanol group or a hydrolyzable group is bonded or the like), and the crosslinked polymer or the crosslinkable organopolysiloxane as the material may be used as the organopolysiloxane in the present invention.

As the organopolysiloxane used in the present invention, in a case where the coating liquid containing the organopolysiloxane is applied to a glass substrate, an organopolysiloxane having a main exothermic peak temperature when heated at a heating rate of 10° C./min within a range of at least 300° C. and at most 500° C. and less than the temperature of the glass substrate when the coating liquid is applied, is preferred. Further, in a case where the coating liquid containing the organopolysiloxane is applied to a glass ribbon, it is preferably an organopolysiloxane having a main exothermic peak temperature when heated at a heating rate of 10° C./min within a range of at least 300° C. and at most 500° C. and less than the temperature of the glass ribbon at a position where the coating liquid is applied. The temperature at a position where the main exothermic peak appears when the organopolysiloxane is heated at a heating rate of 10° C./min will hereinafter be referred to as an exothermic peak temperature.

At the exothermic peak temperature or higher, the organopolysiloxane is thermally decomposed to be converted to silicon oxide. Accordingly, an organopolysiloxane having an exothermic peak temperature lower than the temperature of the glass substrate when the coating liquid is applied or the temperature of the glass ribbon at a position where the coating liquid is applied is used. In other words, when an organopolysiloxane having a certain exothermic peak temperature is used, the temperature of the glass substrate to which the coating liquid is applied is set to be a temperature exceeding the exothermic peak temperature, and the position at which the coating liquid is applied to a glass ribbon is set to be a position at which the temperature of the glass ribbon exceeds the exothermic peak temperature.

The temperature of the glass substrate when the coating liquid is applied or the temperature of the glass ribbon at a position where the coating liquid is applied is from 400 to 650° C. The coating liquid in the present invention contains inorganic fine particles. In order that the inorganic fine particles will be well formed into a film, a temperature lower by about 100° C. than the surface temperature of the glass substrate or the glass ribbon is preferred. Usually, the surface temperature of the glass ribbon between the float bath outlet and the annealing furnace is about 600° C. Accordingly, considering the exothermic peak temperature of the inorganic fine particles, the organopolysiloxane used in the present invention is selected from ones having an exothermic peak temperature of at most 500° C.

Further, if the temperature of the glass substrate or the glass ribbon and the exothermic peak temperature of the organopolysiloxane are close to each other, the rate of the thermal decomposition reaction by which the organopolysiloxane is converted to silicon oxide tends to be low. Accordingly, byproducts such as carbides may remain, and the productivity may be insufficient. The difference between both the temperatures is preferably at least 30° C., more preferably at least 50° C., and in order to obtain a sufficient reaction rate, it is further preferably at least 100° C. Considering the exothermic peak temperature of the inorganic fine particles, the organopolysiloxane to be used in the present invention is preferably selected from organopolysiloxanes having an exothermic peak temperature within a range of at least 300° C. and at most 500° C. and less than the temperature of the glass substrate when the coating liquid is applied or the temperature of the glass ribbon at a position where the coating liquid is applied.

By the exothermic peak temperature being at least 300° C. and at most 500° C., in a case where the coating liquid is applied e.g. by spraying by means of a spray method, the organopolysiloxane is less likely to be thermally decomposed before it reaches the surface of the glass substrate or the glass ribbon. When the exothermic peak temperature is less than the temperature of the glass substrate when the coating liquid is applied or the temperature of the glass ribbon at a position where the coating liquid is applied, film-deposition reaction will take place immediately after the organopolysiloxane reaches the surface of the glass substrate or the glass ribbon, whereby an inorganic fine particle-containing silicon oxide film can be formed on the glass substrate or the glass ribbon with a good film deposition efficiency.

(Inorganic Fine Particles)

The inorganic fine particles in the present invention may be metal oxide fine particles or metal fine particles. The inorganic fine particles are properly selected depending upon the functions required for the glass substrate provided with an inorganic fine particle-containing silicon oxide film.

The materials of the inorganic fine particles in the present invention are as follows, classified according to the function.

Ultraviolet shielding: Zinc oxide, cerium oxide, and the like.

Infrared shielding: Indium tin oxide (ITO), antimony tin oxide (ATO), tungsten oxide, erbium, and the like.

Antistatic: ITO, ATO, silver and the like.

Photocatalyst: Titanium oxide and the like.

Wavelength conversion: Zinc oxide, europium-doped zinc oxide, zinc sulfide, europium-doped zinc sulfide, indium phosphide, bismuth-doped calcium sulfide, europium-doped calcium fluoride, europium-doped yttrium vanadate, and the like.

The shape of the inorganic fine particles may, for example, be spheres, granules, rods, beads, fibers, flakes, hollow particles, aggregates, or indeterminate shape. The inorganic fine particles may be core-shell particles wherein one component is covered with another component. Further, the inorganic fine particles may be surface-treated with a surfactant, a polymer dispersing agent, a silane coupling agent or the like.

The average primary particle size of the inorganic fine particles is preferably at most 100 nm. When the average primary particle size of the inorganic fine particles is at most 100 nm, a decrease in the transmittance by scattering of light can be suppressed. Further, the inorganic fine particles may be inactive to heat at from 400 to 650° C., that is, they may be one not formed into a film, or one having a remarkably low deposition efficiency, when an inorganic fine particle dispersion alone is used as a coating liquid.

The average primary particle size of the inorganic fine particles is measured by a dynamic scattering method in a state of a dispersion.

(Liquid Medium)

The liquid medium in which the organopolysiloxane may be dissolved, may be a solvent in which the organopolysiloxane is dissolved, and it may, for example, be a hydrocarbon (such as a saturated aliphatic hydrocarbon or an aromatic hydrocarbon), an unsaturated hydrocarbon, dichloroethane, trichloroethylene, chlorobenzene, dimethylformamide, methanol, ethanol, acetone, cyclohexanone or acetylacetone.

The liquid medium in which the organopolysiloxane may be dispersed (or emulsified) may be one in which the organopolysiloxane is not soluble, and specifically, water may be mentioned. Further, depending on the type of the organopolysiloxane, an organic solvent in which it is not soluble may be used, and the above solvent may be mentioned.

In a case where the coating liquid is applied e.g. by spraying by means of a spray method, the liquid medium in the coating liquid may be one which is evaporated and removed before the coating liquid reaches the surface of the glass substrate or the glass ribbon, or may be one which is evaporated and removed after the coating liquid reaches the surface of the glass substrate or the glass ribbon at high temperature. In order to form a uniform inorganic fine particle-containing silicon oxide film on the glass substrate or the glass ribbon, it is preferred that the organopolysiloxane is thermally decomposed after a film of the organopolysiloxane is formed on the glass substrate or the glass ribbon. Accordingly, it is preferred that a liquid medium having a relatively high boiling point is used, and after a film of the organopolysiloxane containing the liquid medium is formed on the glass substrate or the glass ribbon, the liquid medium is evaporated.

The boiling point of the liquid medium is preferably at least 60° C., more preferably at least 65° C. When the boiling point of the liquid medium is at least 60° C., the liquid medium is less likely to be vaporized before the coating liquid is attached to the surface of the glass substrate or the glass ribbon at high temperature, whereby a good deposition efficiency of the inorganic fine particle-containing silicon oxide film will be obtained. The upper limit of the boiling point of the liquid medium is not limited so long as the liquid medium has a boiling point lower than the temperature of the surface of the glass substrate or the glass ribbon to which the coating liquid is applied. However, usually a liquid medium having a boiling point less than 300° C. is used. In order to quickly remove the liquid medium by evaporation on the glass substrate or the glass ribbon, the boiling point of the liquid medium is preferably at most 250° C. The boiling point of the liquid medium is more preferably from 80 to 200° C.

(Coating Liquid)

The coating liquid contains an organopolysiloxane and inorganic fine particles, and preferably further contains a liquid medium in view of e.g. the deposition efficiency of the inorganic fine particle-containing silicon oxide film, adjustment of the viscosity of the coating liquid and the handling efficiency of the coating liquid when applied.

However, when the viscosity of the organopolysiloxane is sufficiently low, the liquid medium is not necessarily required.

The film component concentration in the coating liquid (i.e. the total concentration of the organopolysiloxane and the inorganic fine particles to be the film components in the coating liquid) is preferably from 5 to 90 mass %, more preferably from 10 to 85 mass %, in view of e.g. the deposition efficiency of the inorganic fine particle-containing silicon oxide film, adjustment of the viscosity of the coating liquid and the handling efficiency of the coating liquid when applied.

The proportion of the organopolysiloxane is preferably from 70 to 98 mass %, more preferably from 80 to 97 mass %, per 100 mass % of the film components in the coating liquid (i.e. the total amount of the organopolysiloxane and the inorganic fine particles in the coating liquid). When the proportion of the organopolysiloxane is at least 70 mass %, the refractive index of the inorganic fine particle-containing silicon oxide film can be suppressed to be low. When the proportion of the organopolysiloxane is at most 98 mass %, functions derived from the inorganic fine particles can sufficiently be obtained.

The proportion of the inorganic fine particles is preferably from 2 to 30 mass %, more preferably from 3 to 20 mass %, per 100 mass % of the film components in the coating liquid (i.e. the total amount of the organopolysiloxane and the inorganic fine particles in the coating liquid). When the proportion of the inorganic fine particles is at least 2 mass %, functions derived from the inorganic fine particles can sufficiently be obtained. When the proportion of the inorganic fine particles is at most 30 mass %, the refractive index of the inorganic fine particle-containing silicon oxide film can be suppressed to be low.

(Application of Coating Liquid)

Application of the coating liquid is carried out by applying a coating liquid having inorganic fine particles added to a liquid organopolysiloxane or a coating liquid having inorganic fine particles added to a solution or dispersion of an organopolysiloxane, to the glass substrate or the glass ribbon.

The method of applying the coating liquid is preferably a spray method of spraying a coating liquid containing an organopolysiloxane and inorganic fine particles and a liquid medium by means of a nozzle (for example, a spray gun), with a view to producing a glass substrate having an inorganic fine particle-containing silicon oxide film with good production efficiency.

As a specific application method by the spray method, the following methods (i) and (ii) may, for example, be mentioned, and the method (ii) is preferred in view of the small number of steps and with a view to producing a glass substrate having an inorganic fine particle-containing silicon oxide film with better production efficiency.

(i) A method of spraying a coating liquid over a glass substrate from a nozzle while the nozzle is moved above the fixed glass substrate.

(ii) A method of spraying a coating liquid over a glass ribbon from a nozzle provided at a position where the glass ribbon moving in one direction is within the after-mentioned temperature range. It is particularly preferred to spray the coating liquid over a glass ribbon obtained by forming molten glass in a float bath, between the float bath and an annealing step or in the annealing step.

The temperature of the glass substrate or the glass ribbon when the coating liquid is applied is from 400 to 650° C., and the organopolysiloxane is thermally decomposed and converted to silicon oxide on the glass substrate or the glass ribbon within the above temperature range. The temperature of the glass substrate or the glass ribbon when the coating liquid is applied is more preferably from 500 to 650° C. If the temperature of the glass substrate or the glass ribbon is less than 400° C., it will take long until the organopolysiloxane on the glass substrate is thermally decomposed to silicon oxide, thus leading to low productivity. When the temperature of the glass ribbon is at most 650° C., the coating liquid is sprayed at a position where the glass ribbon has exited the float bath, not in the float bath, whereby the atmosphere in the float bath will hardly be contaminated during the spraying.

Here, the temperature of the glass substrate or the glass ribbon means a surface temperature on a side to which the coating liquid is applied.

In a case where the coating liquid is applied to the glass ribbon, the coating liquid is applied to the glass ribbon at a position where the glass ribbon is within a temperature range of from 400 to 650° C. The position where the coating liquid is to be applied is more preferably a position where the glass ribbon is within a temperature range of from 500 to 650° C. In a case where a glass substrate is produced by the float process, the temperature of the glass ribbon at a position immediately after the float bath is usually at a level of 650° C. in the case of soda lime silica glass, although it depends on the glass composition of the glass substrate. Accordingly, a temperature of the glass ribbon at a position where the coating liquid is applied higher than 650° C. is not realistic. The glass ribbon which has left the float bath is annealed in the annealing step and cooled to at most 400° C. during the annealing step.

The organopolysiloxane is thermally decomposed and converted to silicon oxide on the glass substrate or the glass ribbon. On that occasion, presence of oxygen is necessary in the thermal decomposition atmosphere. In an atmosphere without oxygen, the organopolysiloxane tends to be depolymerized into a low molecular weight organopolysiloxane, and such a low molecular weight organopolysiloxane, which is a low boiling point compound, is likely to be vaporized. Accordingly, in an atmosphere without oxygen, the organopolysiloxane will not be converted to silicon oxide but is likely to be vaporized and disappear. Accordingly, thermal decomposition of the organopolysiloxane is carried out in an oxygen-containing atmosphere (for example, in the air or in the atmosphere). In a case where the coating liquid is applied to a glass ribbon formed by the float process, the application position is at the downstream of the float bath outlet. Since the interior of the float bath is usually kept in a reducing atmosphere, an inorganic fine particle-containing silicon oxide film will hardly form even if the coating liquid is applied to the glass ribbon in the interior of the float bath. At the downstream of the float bath outlet, even if a reducing gas discharged from the float bath is included in the air, usually oxygen in a sufficient amount for formation of silicon oxide is present in the atmosphere. Further, the glass ribbon after the float bath outlet moves to an annealing apparatus (such as an annealing furnace), and the atmosphere in the interior of the annealing apparatus is also usually in a heated air atmosphere. Accordingly, the position at which the coating liquid is applied to the glass ribbon is preferably at a position between the float bath and the annealing step, or at a position in the annealing step.

The application amount of the coating liquid is preferably such an amount that the thickness of the inorganic fine particle-containing silicon oxide film at the thinnest portion is from 10 to 300 nm.

The thickness of the inorganic fine particle-containing silicon oxide film is preferably from 10 to 300 nm. An inorganic fine particle-containing silicon oxide film having a thickness within such a range is useful as an antireflection film. Here, the inorganic fine particle-containing silicon oxide film having such a thickness may have a convex portion of 300 nm or thicker. However, in a case where an inorganic fine particle-containing silicon oxide film to be used for a purpose other than antireflection is to be formed, its thickness is not limited to the above range.

(Function Effect)

In the above-described process for producing a glass substrate provided with an inorganic fine particle-containing silicon oxide film of the present invention, as the coating liquid containing an organopolysiloxane having an exothermic peak temperature of at mot 500° C. and inorganic fine particles is applied to a heated glass substrate or glass ribbon, an inorganic fine particle-containing silicon oxide film can be formed with good production efficiency as compared with a sputtering method or a CVD method. Further, the film containing silicon oxide as the main component contains inorganic fine particles and thus has functions derived from the inorganic fine particles. Further, the refractive index of an inorganic fine particle-containing silicon oxide film can be suppressed to be low as compared with a silicon oxide film containing a high refractive index metal oxide. Accordingly, a glass substrate having an inorganic fine particle-containing silicon oxide film having a low light reflectance, having a high light transmittance and having functions derived from the inorganic fine particles imparted, can be produced with good production efficiency.

Further, with respect to the glass substrate provided with an inorganic fine particle-containing silicon oxide film obtained by the production process of the present invention, as the surface of the glass substrate is covered with a thin film of silicon oxide, weathering on the surface of the glass substrate can be suppressed.

EXAMPLES

Now, the present invention will be described in further detail with reference to Examples. However, it should be understood that the present invention is by no mean restricted to such specific Examples.

Examples 1, 2 and 4 are Examples of the present invention, and Example 3 is a Comparative Example.
(Exothermic Peak Temperature)

Exothermic peaks which appeared when a silicone oil was heated from 25° C. to 700° C. at a heating rate of 10° C./min were measured by TG-DTA (manufactured by Bruker AXS, ASC 7000S). The temperature at which the highest exothermic peak among the exothermic peaks appeared was regarded as the exothermic peak temperature.
(Kinematic Viscosity)

The kinematic viscosity (25° C. and 40° C.) of a silicone oil was measured by an Ubbellohde viscometer as specified in JIS Z8803 (1991).
(Reduction in Transmittance)

The difference in the transmittance (the reduction in the transmittance) was obtained by subtracting the average of transmittances at wavelengths of from 500 to 550 nm of a glass substrate on which an inorganic fine particle-containing silicon oxide film was formed, from the average of transmittances at wavelengths of from 500 to 550 nm of a glass substrate on which no inorganic fine particle-containing silicon oxide film was formed. The lower this value is, the more the reduction in the glass transmittance which occurs when a high refractive index film is formed can be suppressed.

Example 1

A long chain alkyl-modified silicone oil (manufactured by Shin-Etsu Silicone, X-22-7322, exothermic peak temperature: 480° C., viscosity average molecular weight: 6,000) was dissolved in n-decane (manufactured by KANTO CHEMICAL CO., INC., boiling point: 174.1° C.), and a dispersion of zinc oxide fine particles (manufactured by BYK Japan K.K., NANOBYK-3842, average primary particle size of zinc oxide fine particles: 40 nm, concentration of zinc oxide fine particles: 40 mass %, dispersion medium: aromatic free white spirit) was added thereto to prepare a coating liquid. In Table 1, the proportion of the total amount of the organopolysiloxane and the inorganic fine particles to be film components in the coating liquid (i.e. the concentration of the film components) and the respective proportions of the organopolysiloxane and the inorganic fine particles in the film components are shown.

As an application apparatus, KM-100 (manufactured by SPD Laboratory Inc.) was used. As a glass substrate, highly transparent glass (manufactured by Asahi Glass Company, Limited) of 10 cm×10 cm×4 mm was used.

The glass substrate was placed on a stage, and a heater was provided on the rear side of the stage not to be in contact with the stage. The glass substrate was heated to 600° C. via the stage by the radiant heat of the heater. The temperature of the glass substrate was measured by bringing a thermocouple in contact with one side surface of the glass substrate. Since the glass substrate was heated for a sufficient time before the coating liquid was sprayed by a spray gun, the temperature measured here can be considered to be substantially the same as the surface temperature of the glass substrate.

Figure 1:
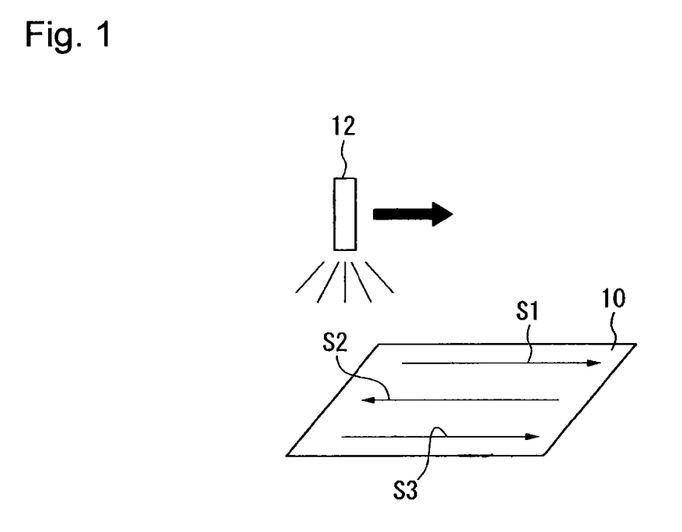
FIG. 1 is a perspective illustrating one example of the application method in
Examples.

After the glass substrate was heated to 600° C., as shown in FIG. 1, the coating liquid was sprayed over the glass substrate 10 from a spray gun 12 while the spray gun 12 was moved in three steps S1 to S3 above the glass substrate 10. Regarding three steps S1 to S3 as one cycle, application was carried out in five cycles. Further, when the coating liquid was sprayed from the spray gun 12, the liquid-sending pressure to the spray gun 12 was adjusted so that the liquid-sending rate would be from 0.4 to 0.6 mL/sec, and the spraying pressure was set to 0.1 MPa. The application time in each step was 10 seconds. Spraying was carried out in a state where the stage, the glass substrate and the spray gun were surrounded by an explosion-proof apparatus, and the ambient temperature was not adjusted.

Figure 2:
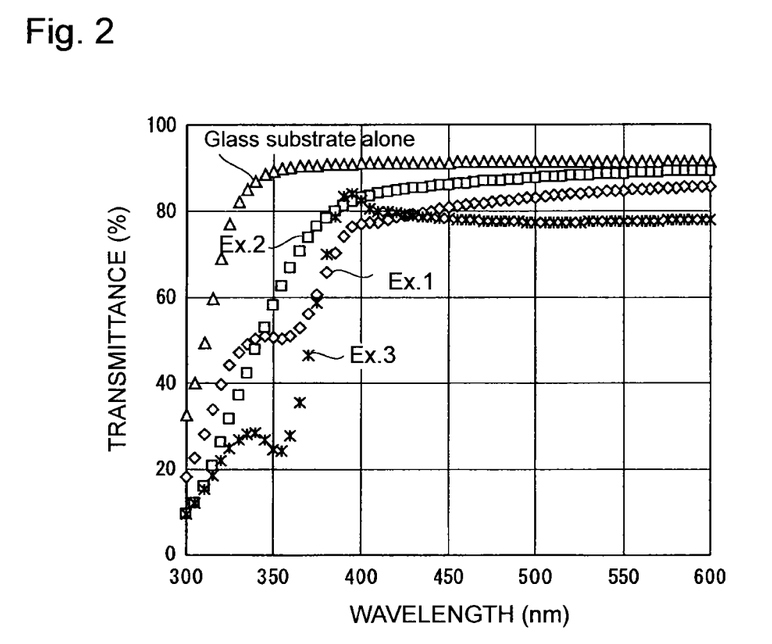
FIG. 2 is a graph illustrating the reflectances of glass substrates in Examples.

The reduction in the transmittance, and the transmittance, of the glass substrate on which an inorganic fine particle-containing silicon oxide film was formed were measured. The results are shown in Table 1 and FIG. 2.

Example 2

A long chain alkyl-modified silicone oil (manufactured by Shin-Etsu Silicone, X-22-7322, exothermic peak temperature: 480° C., viscosity average molecular weight: 6,000) was dissolved in n-decane (manufactured by KANTO CHEMICAL CO., INC., boiling point: 174.1° C.), and a dispersion of cerium oxide fine particles (manufactured by BYK Japan K.K., NANOBYK-3812, average primary particle size of cerium oxide fine particles: 10 nm, concentration of cerium oxide fine particles: 30 mass %, dispersion medium: aromatic free white spirit) was added thereto to obtain a coating liquid. In Table 1, the proportion of the total amount of the organopolysiloxane and the inorganic fine particles to be film components in the coating liquid (i.e. the concentration of the film components) and the respective proportions of the organopolysiloxane and the inorganic fine particles in the film components are shown.

A glass substrate on which an inorganic fine particle-containing silicon oxide film was formed was obtained in the same manner as in Example 1 except that the coating liquid was changed.

The reduction in the transmittance of the glass substrate on which an inorganic fine particle-containing silicon oxide film was formed was measured. The results are shown in Table 1 and FIG. 2.

Example 3

Zinc acetate dihydrate (manufactured by KANTO CHEMICAL CO., INC.) was added to N,N-dimethylformamide (manufactured by KANTO CHEMICAL CO., INC., boiling point: 153.0° C.) to obtain a solution containing zinc acetate dihydrate in an amount of 20 mass % based on the entire liquid amount.

A glass substrate on which a zinc oxide (ZnO) film was formed was obtained in the same manner as in Example 1 except that the coating liquid was changed.

The reduction in the transmittance of the glass substrate on which a ZnO film was formed was measured. The results are shown in Table 1 and FIG. 2.

TABLE 1

| | Coating liquid | | | | | |
|---|---|---|---|---|---|---|
| Ex. | Component 1 | Component 2 | Film component concentration in coating liquid [mass %] | Proportion of organopolysiloxane in film component [mass %] | Proportion of inorganic fine particles in film component [mass %] | Evaluation Reduction in transmittance [%] |
| 1 | Long chain alkyl-modified silicone oil | Zinc oxide fine particles | 82 | 85 | 15 | 7.5 |
| 2 | Long chain alkyl-modified silicone oil | Cerium oxide fine particles | 76 | 92 | 8 | 3.3 |
| 3 | Zinc acetate dihydrate | — | 20 | — | — | 14.0 |

It is found that the reflectance to visible light (wavelength: 500 to 550 nm) and the transmittance to ultraviolet light (wavelength: at most 400 nm) of the glass substrate provided with an inorganic fine particle-containing silicon oxide film in each of Examples 1 and 2 are sufficiently lowered as compared with a highly transparent glass plate alone.

On the other hand, of the glass substrate provided with a ZnO film in Example 3, the transmittance to ultraviolet light (wavelength: at most 400 nm) is sufficiently lowered as compared with a highly transparent glass plate alone, but the reflectance to visible light (wavelength: 550 to 650 nm) is high.

Example 4

Figure 3:
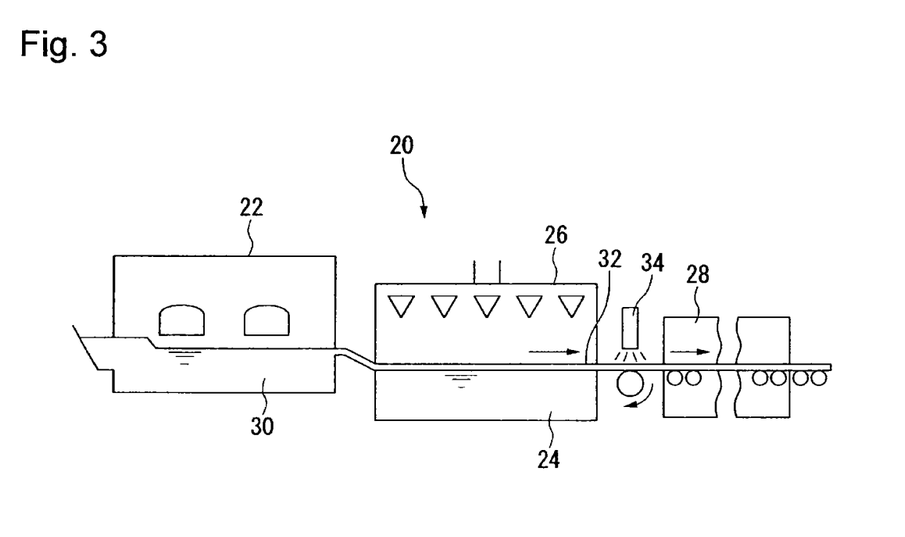
FIG. 3 is a view schematically illustrating one example of a glass production apparatus to carry out the process of the present invention.

Using a glass production apparatus shown in FIG. 3, a glass substrate on which an inorganic fine particle-containing silicon oxide film is formed is produced. A glass production apparatus 20 comprises a melting furnace 22 which melts glass raw materials into molten glass 30, a float bath 26 which forms the molten glass into a glass ribbon 32 to be a glass substrate by floating the molten glass 30 supplied from the melting furnace 22 on the surface of molten tin 24, an annealing furnace 28 to anneal the glass ribbon 32, and an air spray gun 34 provided between the outlet of the float bath 26 and the inlet of the annealing furnace 28 with a height of 570 mm above the glass ribbon 32. The glass ribbon 32 which has left the annealing furnace 28 is cut by a cutting apparatus not shown to be a glass substrate.

The long chain alkyl-modified silicone oil (manufactured by Shin-Etsu Silicone, X-22-7322, exothermic peak temperature: 480° C., viscosity average molecular weight: 6,000) was dissolved in n-decane (manufactured by KANTO CHEMICAL CO., INC., boiling point: 174.1° C.), and a dispersion of zinc oxide fine particles (manufactured by BYK Japan K.K., NANOBYK-3842, average primary particle size of zinc oxide fine particles: 40 nm, concentration of zinc oxide fine particles: 40 mass %, dispersion medium: aromatic free white spirit) is added thereto to prepare a coating liquid with a proportion of the total amount of the organopolysiloxane and the inorganic fine particles as the film components in the coating liquid of 82 mass %, a proportion of the long chain alkyl-modified silicone oil of 85 mass % and a proportion of zinc oxide fine particles of 15 mass %.

The coating liquid is sprayed from a spray gun 34 over the glass ribbon 32 moving at a transfer rate of 4.2 m/min, at a position between the float bath 26 and the annealing furnace 28 at which the surface temperature of the glass ribbon 32 is 600° C., at a liquid-sending rate of 36 kg/hr under a spraying pressure of 4.5 kg/cm$^2$ to form a film of the silicone oil on the glass ribbon 32, and then the silicone oil is thermally decomposed to form an inorganic fine particle-containing silicon oxide film on the glass ribbon 32.

As described above, according to the process for producing a glass substrate provided with an inorganic fine particle-containing silicon oxide film of the present invention, as an organopolysiloxane having an exothermic peak temperature of at most 500° C. is used, it is compatible with inorganic fine particles, and a film can be well formed on a glass surface within a temperature range of from 400 to 650° C.

Industrial Applicability

According to the production process of the present invention, an inorganic fine particle-containing silicon oxide film having a high light transmittance, having functions derived from the inorganic fine particles imparted, can be directly formed on a glass substrate or a glass ribbon at high temperature with good production efficiency, and a glass substrate having an inorganic fine particle-containing silicon oxide film produced by this process is useful as a cover glass for a solar cell, a protective plate for a display, glass for an automobile, glass for a railway vehicle, glass for shipping, glass for a building material, etc.

This application is a continuation of PCT Application No. PCT/JP2011/063180, filed on Jun. 8, 2011, which is based upon and claims the benefit of priority from Japanese Patent Application No. 2010-134187 filed on Jun. 11, 2010. The contents of those applications are incorporated herein by reference in its entirety.

Reference Symbols
 10: glass substrate
 12: spray gun
 26: float bath
 28: annealing furnace
 30: molten glass
 32: glass ribbon
 34: air spray gun

What is claimed is:

1. A process for producing a glass substrate provided with an inorganic fine particle-containing silicon oxide film, the process comprising applying a coating liquid comprising an organopolysiloxane and inorganic fine particles to a glass substrate which is at a temperature of 400 to 650° C. to form an inorganic fine particle-containing silicon oxide film on the glass substrate,
    wherein the main exothermic peak temperature of the organopolysiloxane when heated at a heating rate of 10° C./min is at most 500° C., and
    wherein the proportion of the organopolysiloxane is from 70 to 98 mass %, and the proportion of inorganic fine particles is from 2 to 30 mass %, per 100 mass % of the total amount of the organopolysiloxane and the inorganic fine particles in the coating liquid.

2. The process according to claim 1,
    wherein the temperature of the glass substrate when the coating liquid is applied is at least 30° C. higher than the main exothermic peak temperature of the organopolysiloxane, and wherein said main exothermic peak temperature of the organopolysiloxane is at least 300° C.

3. The process according to claim 1, wherein the coating liquid further comprises a liquid medium.

4. The process according to claim 3, wherein the boiling point of the liquid medium is at least 60° C.

5. The process according to claim 1, wherein the organopolysiloxane is a silicone oil.

6. The process according to claim 5, wherein the silicone oil is a long chain alkyl-modified silicone oil.

7. The process according to claim 5, wherein the viscosity average molecular weight of the silicone oil is from 3,500 to 130,000.

8. A process for producing a glass substrate provided with an inorganic fine particle-containing silicon oxide film, comprising forming molten glass into a glass ribbon, annealing the glass ribbon and cutting it to produce said glass substrate,
    wherein a coating liquid comprising an organopolysiloxane and inorganic fine particles is applied to the glass ribbon at a position where the glass ribbon is at a temperature of 400 to 650° C. to form an inorganic fine particle-containing silicon oxide film on the glass ribbon,
    wherein the main exothermic peak temperature of the organopolysiloxane when heated at a heating rate of 10° C./min is at most 500° C., and
    wherein the proportion of the organopolysiloxane is from 70 to 98 mass %, and the proportion of inorganic fine particles is from 2 to 30 mass %, per 100 mass % of the total amount of the organopolysiloxane and the inorganic fine particles in the coating liquid.

9. The process according to claim 8,
    wherein the temperature of the glass ribbon when the coating liquid is applied is at least 30° C. higher than the main exothermic peak temperature of the organopolysiloxane, and wherein said main exothermic peak temperature of the organopolysiloxane is at least 300° C.

10. The process according to claim 8, wherein the molten glass is formed into the glass ribbon in a float bath, and the coating liquid is applied between the float bath and the annealing step or in the annealing step.

11. The process according to claim 8, wherein the coating liquid further comprises a liquid medium.

12. The process according to claim 11, wherein the boiling point of the liquid medium is at least 60° C.

13. The process according to claim 8, wherein the organopolysiloxane is a silicone oil.

14. The process according to claim 13, wherein the silicone oil is a long chain alkyl-modified silicone oil.

15. The process according to claim 13, wherein the viscosity average molecular weight of the silicone oil is from 3,500 to 130,000.

* * * * *